United States Patent

Tsuchida et al.

[11] Patent Number: 5,819,706
[45] Date of Patent: Oct. 13, 1998

[54] AIR-ASSISTED INJECTION SYSTEM FOR MULTI-VALVE ENGINE

[75] Inventors: Naoki Tsuchida; Hiroyuki Tsuzuku; Takeshi Ito, all of Iwata, Japan

[73] Assignee: Yamaha Hatsudoki Kabushiki Kaisha, Iwata, Japan

[21] Appl. No.: 498,017

[22] Filed: Jul. 3, 1995

[30] Foreign Application Priority Data

Jul. 1, 1994  [JP]  Japan .................................. 6-173397

[51] Int. Cl.$^6$ .................................................. F02B 31/00
[52] U.S. Cl. .......................................... 123/432; 123/308
[58] Field of Search ............................ 239/533.12, 436; 123/432, 308, 585, 531

[56] References Cited

U.S. PATENT DOCUMENTS

| | | | |
|---|---|---|---|
| 4,955,347 | 9/1990 | Toyoda ..................................... | 123/472 |
| 4,982,716 | 1/1991 | Takeda et al. ............................ | 123/531 |
| 5,186,140 | 2/1993 | Ueda et al. ............................... | 123/308 |
| 5,211,682 | 5/1993 | Kadowaki et al. ...................... | 123/531 |
| 5,224,458 | 7/1993 | Okada et al. ............................ | 123/531 |
| 5,359,972 | 11/1994 | Isaka ........................................ | 123/308 |
| 5,487,365 | 1/1996 | Isaka ........................................ | 123/306 |
| 5,520,157 | 5/1996 | Pontoppidance ...................... | 123/531 |

FOREIGN PATENT DOCUMENTS

| | | |
|---|---|---|
| 58-204952 | 11/1983 | Japan . |
| 559952 | 3/1993 | Japan . |
| 6317237 | 11/1995 | Japan . |

Primary Examiner—Willis R. Wolfe
Assistant Examiner—Hieu T. Vo
Attorney, Agent, or Firm—Knobbe, Martens, Olson & Bear LLP

[57] ABSTRACT

A number of embodiments of multi-valve internal combustion engines having a manifold fuel injection and a control valve which changes the air flow pattern into the combustion chamber between an unrestricted flow and a restricted flow wherein turbulence is generated. An air assist arrangement including a number of different embodiments of insert pieces are employed for changing the spray pattern in response to the position of the control valve so as to provide the desired fuel flow into the combustion chamber when the control valve is controlling the air flow.

25 Claims, 16 Drawing Sheets

AIR-ASSISTED INJECTION SYSTEM FOR MULTI-VALVE ENGINE

BACKGROUND OF THE INVENTION

This invention relates to an air-assisted injection system for a multi-valve engine and more particularly to an improved induction and injection control system for internal combustion engines.

As is well known, the design of the induction and injection system for internal combustion engines is another one of the many areas where the overall design of the system represents a compromise between obtaining maximum power output and good running at low engine speeds and engine loads. As is well known, an induction system that permits maximum charging efficiency and high-power outputs is substantially large in cross-sectional area and relatively unencumbered. As a result, the charge which enters the combustion chamber may enter at a relatively high velocity and without substantial flow restrictions at high speeds and high loads. On the other hand, such large unrestricted passages provide very slow air flow at low speeds and low loads. As a result, the charge in the combustion chamber is relatively static and flame propagation is slow and at times combustion can become incomplete.

Therefore, conventional induction systems are a compromise between maximum power output and good low-speed running. The particular application for the engine determines which condition is favored.

In order to attain higher engine outputs and better induction efficiency, it is the normal practice to employ multiple intake valves. The use of multiple intake valves permits a greater flow area without increased inertia for the valves and their operating mechanism. However, these systems also have the problems aforenoted with respect to poor running under low-speed, low-load conditions.

There have, therefore, been proposed what may be considered to be compound induction systems wherein the flow through one or more of the intake passages is restricted under some load and speed conditions so as to attempt to optimize the induction efficiency by increasing turbulence and increasing the flow velocity under the lower-speed, lower-load conditions. In addition, arrangements have been provided for introducing turbulence even through the intake passages which are opened or operative even under low-speed, low-load conditions so as to induce the desired types of motion, for example, swirl and/or tumble. These systems generally improve overall performance.

However, it has also become a practice in order to utilize fuel injection and particularly manifold injection or intake port injection in order to further improve engine control and performance. However, where manifold injectors are employed, their spray patterns are generally fixed. It should be obvious from the foregoing description that the conventional fuel injection systems, although providing the desired spray pattern under some running conditions, will not provide the best spray pattern under other running conditions.

This problem is also particularly acute when the flow through the given or operative intake passage is varied during running conditions. For example, if the flow direction through one of the intake passages is in one direction and in one specific area at one running speed and in a different area and different condition in another running speed, then the fuel injection nozzle spray pattern may not be optimum.

Another problem exists with fuel injection, which also is related to the varying conditions under which the injection system must cope. For example, under some conditions it may be desirable to provide a large penetration of the fuel into the combustion chamber. This generally requires small nozzle openings and high pressures. However, this arrangement, when operating at low speeds and low loads may not provide adequate vaporization of the fuel.

There have been proposed, therefore, air assist systems wherein air is mixed with the injected fuel, at least under some running conditions in order to assist in vaporization. At times, this air has also been employed for attempting to change the direction of the flow from the injectors. However, the previously proposed systems, although tending in the right direction, have not been adequately operative to provide the desired spray pattern changes and/or fuel vaporization.

It is, therefore, a principal object of this invention to provide an improved induction and injection system for an internal combustion engine.

It is another object of this invention to provide an improved induction control system for controlling the air flow to the combustion chamber in response to engine conditions and an interrelated injection system wherein the direction of fuel injection is also varied in response to the change induction system characteristics.

As has been noted, it has been proposed to employ air assist not only for assisting in the fuel vaporization but also so as to change the direction of fuel spray. However, when the fuel is discharged from the injector to one or two injection nozzles and an attempt is made to control the spray from the nozzle or nozzles, the range of control is somewhat limited.

It is, therefore, a still further object of this invention to provide an improved and multiple injection for a fuel-injection system wherein the direction of injection spray is controlled by controlling which of the injector ports will actually inject fuel.

SUMMARY OF THE INVENTION

A first feature of this invention is adapted to be embodied in an internal combustion engine having an intake port communicating with a combustion chamber for delivering a charge thereto. An intake passage serves the intake port for supplying a charge. A fuel injector injects fuel into the intake passage. An intake control valve is disposed in the intake passage and is moved between a first position wherein the flow into the combustion chamber through the intake port is substantially unrestricted in an a first direction to a second position wherein the flow through the intake port is redirected and accelerated. Means are provided for altering the spray pattern from the fuel injector in response to the position of the control valve.

Another feature of the invention is adapted to be embodied in a fuel injector for an internal combustion engine in which fuel injector has at least first and second discharge ports each having a different spray path. Means are provided for controlling the flow through the discharge ports.

DETAILED DESCRIPTION OF THE PREFERRED EMBODIMENTS OF THE INVENTION

Figure 1:
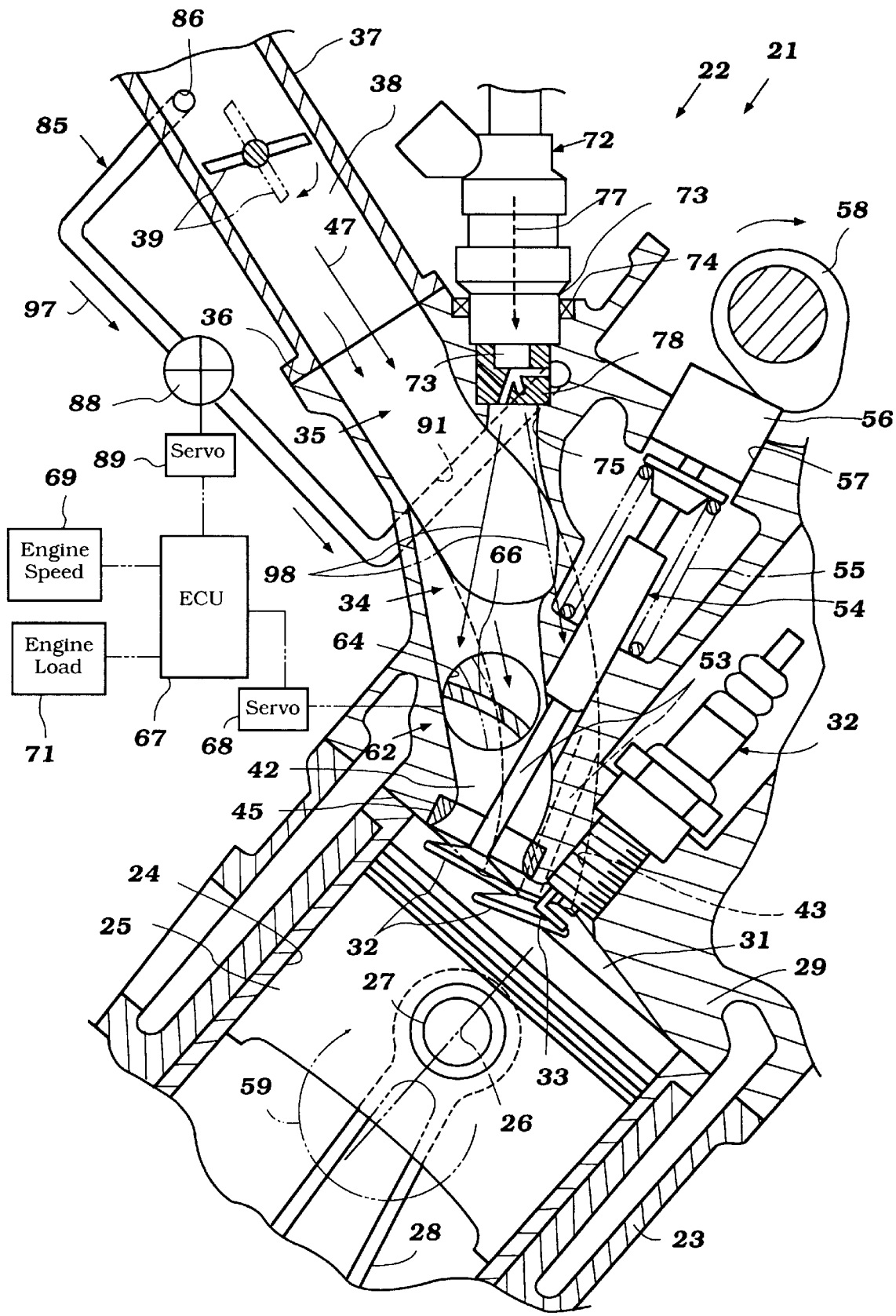
FIG. 1 is a cross-sectional view taken through a single cylinder of an internal combustion engine constructed in accordance with an embodiment of the invention.
Figure 2:
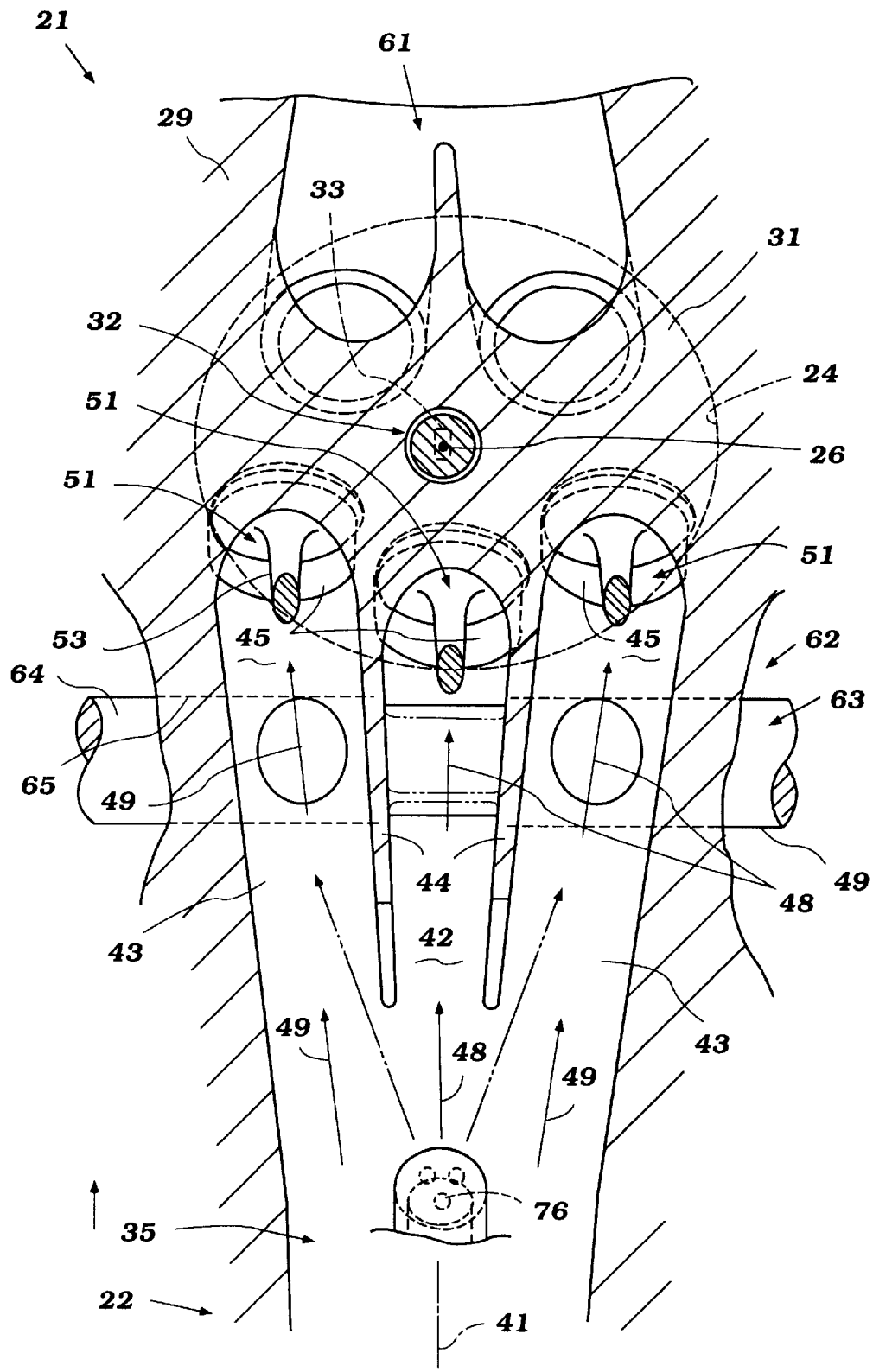
FIG. 2 is a cross-sectional view taken through the cylinder head of the engine along a plane that passes in part through the intake and exhaust passages and which extends generally perpendicularly to the plane of FIG. 1.

Referring now in detail to the drawings and initially to FIGS. 1 and 2, an internal combustion engine constructed in accordance with an embodiment of the invention is shown partially and primarily through a cross-sectional view taken through a portion of one cylinder of the engine 21. Since the invention deals primarily with the induction and fuel injection system for the engine 21, only this is illustrated in detail in the figures and this induction and injection system is indicated generally by the reference numeral 22. Also, the invention is capable of use with a wide variety of engine types and engines having various cylinder numbers and cylinder configurations. For that reason, only a single cylinder is shown and only partially. It will be readily apparent to those of skill in the art how the invention can be employed with engines having various cylinder numbers and cylinder orientations. In fact, the invention can be utilized with V-type or opposed engines and FIG. 1 actually is a view showing one portion of one bank of a V-type engine. Obviously, those skilled in the art will readily understand how the invention can be applied to engines having other cylinder numbers and other orientations.

The engine 21 is comprised of a cylinder block 23 having one or more cylinder bores 24 in which pistons 25 reciprocate. The axes of the cylinder bores 24 is indicated by the broken line 26 in certain of the figures.

The pistons 25 are connected by means of piston pins 27 to connecting rods 28 at the upper or small ends of these connecting rods. The lower ends of the connecting rods 28 are journaled in a known manner on a crankshaft. For reasons which have already been noted, this portion of the engine is not illustrated.

A cylinder head or cylinder head assembly 29 is affixed in any known manner to the cylinder block 23. The cylinder head 29 has individual recesses 31 each of which cooperates with a respective one of the cylinder bores 24 and the heads of the pistons 25 to define variable volume chambers which function as the combustion chambers for the engine. Spark plugs 32 are mounted in the cylinder head 29 so that their spark gaps 33 are disposed substantially on the cylinder bore axis 26. These spark plugs 32 are fired by any suitable known type of ignition system.

The induction and injection system 22 is comprised of a cylinder head intake passage, indicated generally by the reference numeral 34 and which has an inlet opening portion 35 that extends through a surface 36 of the cylinder head assembly 29 and to which an intake manifold 37 is affixed. The intake manifold 37 defines a flow passage 38 in which a flow controlling throttle valve 39 is supported for movement between an idle position as shown in the solid line view of FIG. 1 and a wide open throttle position as shown in the phantom line view in this figure.

As has been noted, the cylinder head intake passage 34 has an inlet portion 35 which extends through the surface 36 and which has a configuration that is generally complementary to that of the section 38 of the intake manifold 37. This passage has a flow axis indicated by the reference numeral 41 in FIG. 2. From this common portion, the intake passage 34 is divided into a center section 42 and a pair of side sections 43 by internal walls 44 of the cylinder head. These passages 42 and 43 each terminate at respective valve seats comprised of a center intake valve seat 45 and a pair of side intake valve seats 46. Hence, the normal flow of intake charge in the induction system consists of a common flow indicated by the arrow 47 (FIG. 1) through the intake manifold passage 38 and the common portion 35 of the cylinder head intake passage 34. This flow then splits into a center section 48 which generally constitutes a continuation of the flow 47 and a pair of side flow paths 49.

The flow through the intake valve seats 45 and 46 is controlled by respective intake valves, each indicated generally by the reference numeral 51 and which have head portions 52 that cooperate with the valve seats 45 and 46 to control the flow through them and stem portions 53. The stem portions 53 are slidably supported in the cylinder head 29 by valve guides 54 that are cast or pressed into place. Although various orientations are possible, the center intake valve associated with the valve seat 45 may reciprocate about an axis that lies at an acute angle to a plane containing the cylinder bore axis 25 and the axis of rotation of the crankshaft. The axes of the intake valves 51 that control the side intake valve seats 48 may be disposed in a common plane that also lies at an acute angle to the aforenoted plane containing the cylinder bore axis 26. This acute angle is greater than the acute angle about which the center intake valve 51 reciprocates.

Coil compression springs 55 cooperate with each of the valves 51 and specifically with keeper retainer assemblies affixed thereto for urging the respective intake valves 51 to their closed positions. Thimble tappets 56 are slidably supported in bores 57 formed in the cylinder head 29 and engage these keeper retainers or shims interposed between the valve stems 53 for urging the valves 51 to their opened positions. An intake cam shaft 58 is rotatably journaled in the cylinder head 29 in any known manner and cooperates with the thimble tappets 56 for actuating the intake valves 51 in a known manner.

It will be noted that the side intake valve seats 46 and the intake passages 43 which serve them are disposed closer to the plane containing the cylinder bore axis 26 and in fact extend partially over this plane. Therefore, the charge which enters the combustion chamber through these valve seats will tend to flow across this plane toward the opposite side of the cylinder bore. The center intake valve seat 45 and its passage 42 is, however, directed more in an axial direction along the axis of the cylinder bore. Hence, under high-speed, high-load running, the side intake passages 43 and their valve seats 46 will tend to generate a tumble action as indicated by the arrow 59 in FIG. 1. A somewhat reverse tumble action will be generated by the center intake valve seat 45 and its passage 42. However, under high-speed, high-load conditions, this counterflow will not significantly or adversely effect the free-breathing and high-performance characteristics of the engine 21.

The side of the cylinder head 29 opposite the intake valves 51 is provided with an exhaust passage, indicated generally by the reference numeral 61 and shown only in FIG. 2. This may be of any known type. The valve arrangement is such that there are three intake valves per cylinder and two exhaust valves per cylinder. Although this is a preferred arrangement, it will be readily apparent to those skilled in the art how the invention can be employed with other systems having numbers of valves and other valve placement. However, and as has been noted, the invention does have particular utility with engines having three intake valves per cylinder.

Figure 3:
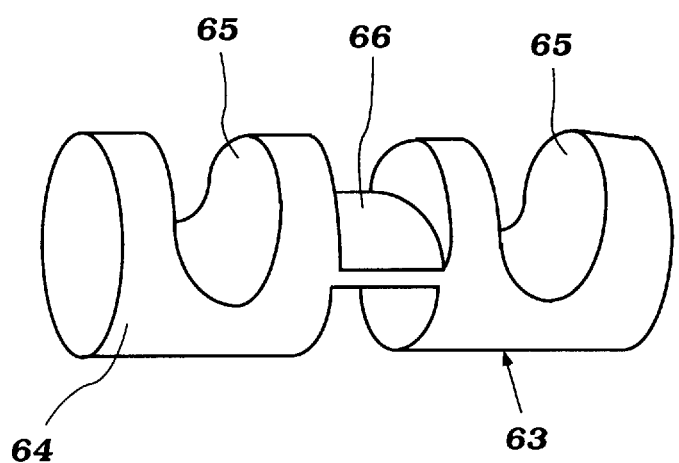
FIG. 3 is an enlarged perspective view of a portion of the control valve of this embodiment.

As should be readily apparent from the foregoing description, the configuration of the intake passages 34 and 38 is such that it will permit high-charging efficiency under high-speed, high-load conditions. However, and as has already been discussed, the arrangement is such that with the structure as thus far described, the low-speed, low-load performance of the engine will be substantially deteriorated. In accordance with an important feature of the invention, therefore, there is provided a control valve assembly, indicated generally by the reference numeral 62 and which includes a control valve element 63 having a configuration as seen in FIG. 3. This control valve element 63 functions, as will be described, so as to change not only the velocity of the air flow into the combustion chamber 31 under certain load and speed relations but also the direction of the air flow.

The control valve 63 has a generally cylindrical outer configuration 64 which is journaled for rotation in a bore 65 formed in the cylinder head in a direction that extends parallel to the rotational axis of the crankshaft. This control valve element 63 is provided with three valving sections comprised of a pair of side sections defined by cylindrical cutouts 65 and a center section configured by a plate-type element 66. When the control valve element 63 is in the position as shown in FIG. 3, the flow to the combustion chamber through the three intake valve seats 45 and 46 will be substantially unrestricted and in the direction aforenoted. In this position, the control valve portion 66 is configured generally like the throttle valve 39. That is, it will extend across the intake passage portion 42 but will not substantially restrict the flow through it.

However, when the control valve element 63 is rotated to the position shown in FIG. 1, the element 66 will direct the flow toward the side of the center intake passage 42 closest to the plane containing the cylinder bore axis 26 and under this condition there will be generated a tumble action as also indicated by the arrow bearing the reference numeral 59. Under this condition, the valving portion 65 may either completely close the side intake passages 43 or restrict them so that the flow velocity through them will also increase. Also, this will direct the flow again toward the opposite side of the cylinder bore and further augment the tumble action. Thus, in this position of the control valve assembly 62, the total valving assembly will generate substantial tumble and more than is generated under the high-speed, high-load conditions.

The control valve assembly 62 is controlled by an ECU, indicated generally by the reference numeral 67 which operates a first servomotor 68 that is coupled to the control valve element 63 for rotating it between its positions. Various engine or ambient condition sensors such as an engine speed sensor 69 and a load sensor 71 output signals indicative of the engine condition to the ECU 67 so as to control the position of the control valve element 63 in conjunction with any desired strategy. Load may be sensed by air flow, position of the throttle valve 39 or various other parameters as is well known in this art.

Figure 4:
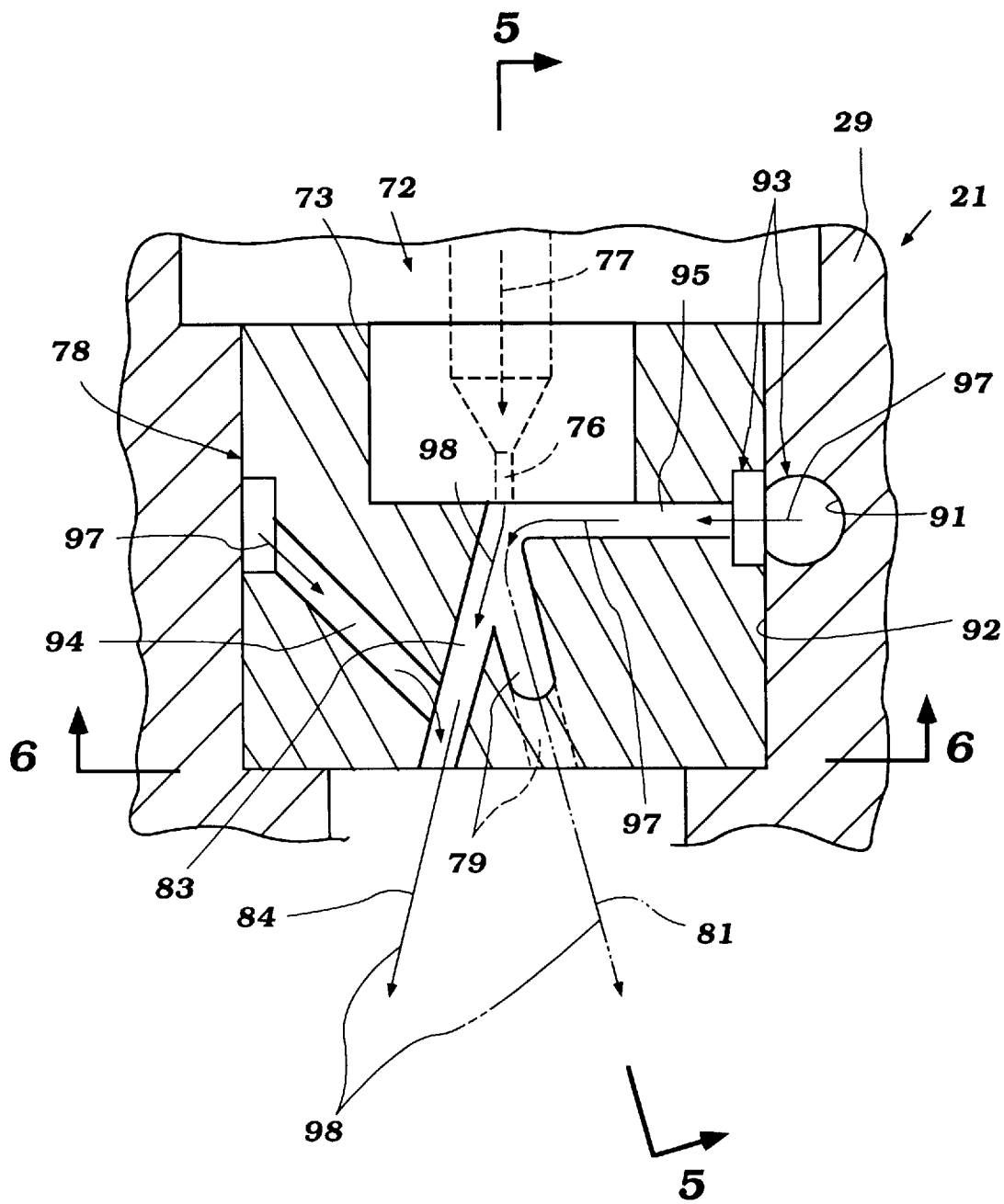
FIG. 4 is an enlarged cross-sectional view taken along the same plane as FIG. 1 and shows further details of the injector arrangement.
Figure 5:
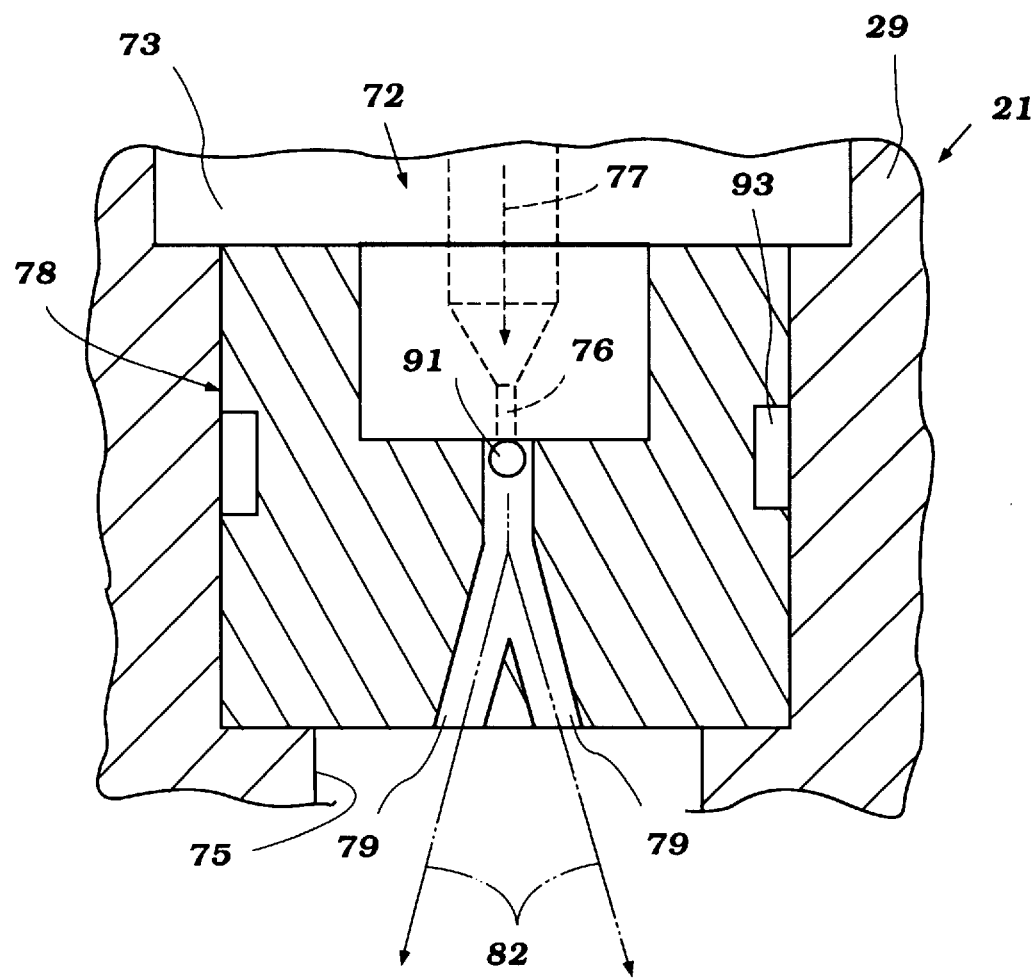
FIG. 5 is a cross-sectional view taken along the line 5—5 of FIG. 4.
Figure 6:
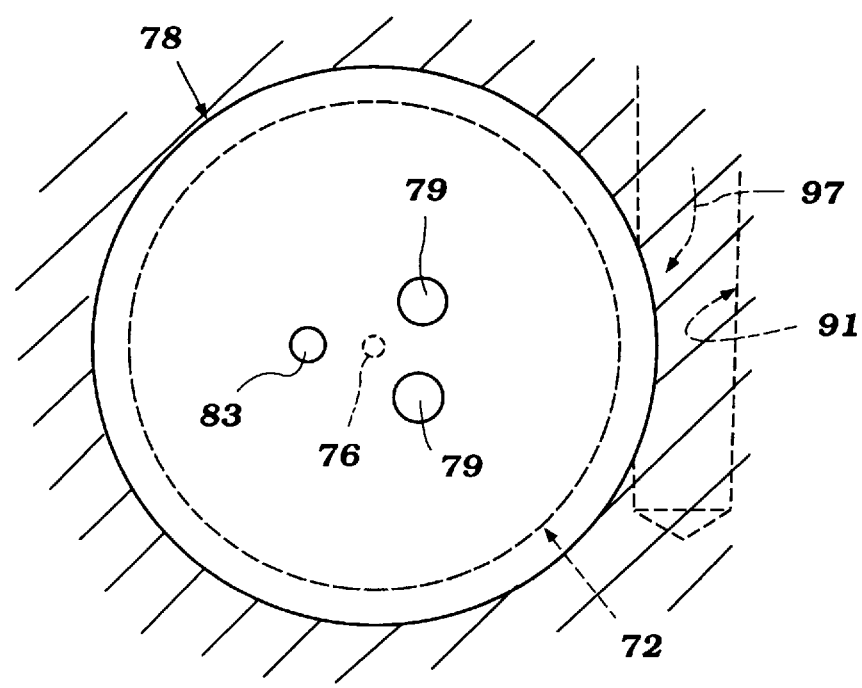
FIG. 6 is a cross-sectional view taken along the line 6—6 of FIG. 4.
Figure 7:
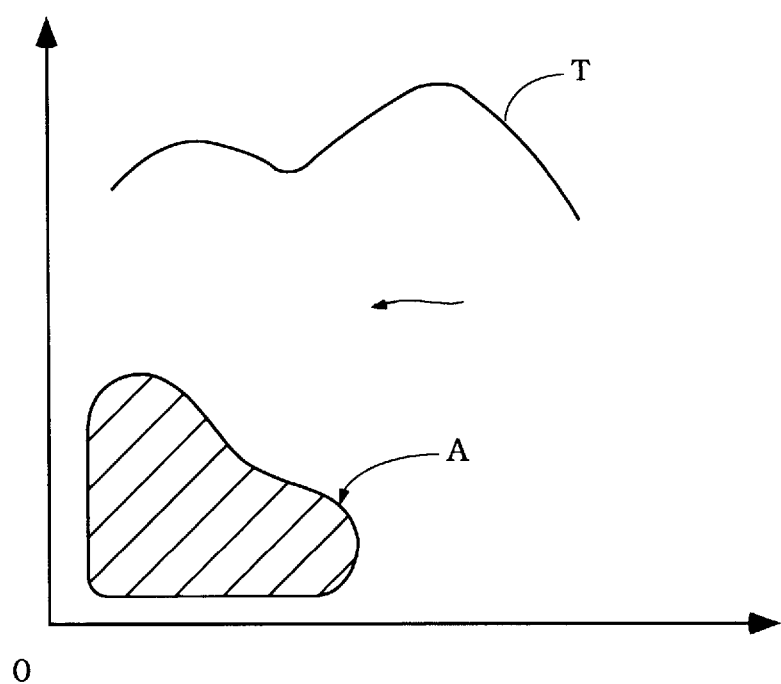
FIG. 7 is a graphical view showing the engine torque in relation to engine speed and also the air assist conditions and time when the fuel spray is redirected in accordance with this embodiment.

In order to supply fuel for the engine operation and for mixing with the intake air, there is provided a fuel injector, indicated generally by the reference numeral 72 and which is mounted so that its nozzle portion 73 is received in a gasketed opening 74 in the cylinder head 29 which intersects a passageway 75 that communicates with the common induction system inlet portion 35 as best shown in FIG. 41. The fuel injector 72 has a single spray nozzle 76 that is disposed generally along a longitudinal central axis 77 of the injector as best seen in FIGS. 4–6 as well as in FIG. 2.

In accordance with another important feature of the invention, the injector 72 rather than spraying directly into the cylinder head opening 75 sprays into an insert piece 78 which has a generally cylindrical configuration. This insert piece 78 is disposed at the mouth of the cylinder head passage 75 and has an opening which is aligned directly with the injector nozzle opening 76. However, this opening has a generally triangular configuration formed by the intersection of three discharge ports. These comprise a pair of first relatively larger diameter discharge ports 79 which extend at an angle relative to each other toward the side intake valve seats 46 and at an angle defined by a line 81 to the injector axis 77 as best seen in FIG. 4. In addition, as shown in FIG. 5, these nozzle openings 79 define an arc 82 between them in a plane perpendicular to the plane of FIG. 4, that being the plane of FIG. 5.

A third smaller diameter passageway 83 extends from this common opening and diverges along a line 84 from the line 81 and is directed, as best seen in FIG. 1, along the side of the center intake passage 42 that is obstructed by the valve member element 66 when in its closed flow redirecting position. The reason for this will be described later.

In order to control the flow through the nozzle passages 79 and 83 and also to supply air for mixture with the injected fuel, particularly under the critical low-speed, low-load conditions, there is provided an air-assist system. This air-assist system includes a conduit 85 (FIG. 1) which extends from a port 86 in the intake manifold 37 upstream of the throttle valve 39. This conduit has a flow control valve 88 in it which is operated by a servo 89 under the control of the ECU 67 so that the air supply will be enabled when the control valve element 63 is in its closed, flow restricting position and closed when the control valve is in its opened position.

The conduit 85 is connected to a drilled passageway 91 formed in the cylinder head 29 and which terminates in an area that intersects a bore 92 of the cylinder head in which the insert piece 21 is received. The drilled passage 91 intersects and breaks out into the bore 92 in an area where the insert piece 78 is formed with a circumferentially extending groove 93. This groove extends around the circumference of the insert piece 78 and intersects a first air passage 94 which, in turn, extends down at an angle and intersects the nozzle passage 83. In addition, there is provided a pair of further drilled passages 95 that extend through the insert piece 78 and intersect the ends of the nozzle passages 79 immediately adjacent where they communicate with the fuel injector nozzle port 76.

It should be noted that the injector nozzle passage 76 is offset slightly toward the centers 81 of the passages 79.

The system operates as follows. When the control valve 62 is in the position shown in FIG. 1, the air control valve 88 will be open. A pressure differential will exist in the conduit 86 causing a flow of air in the direction indicated by the solid arrows 97. This is true because the drilled passage 91 through its communication with the nozzle ports 79 and 83 experiences a lower pressure than that atmospheric pressure that exists at the port 86 upstream of the throttle valve 39 which will be primarily closed under the condition. Hence, the atmospheric air is at a higher pressure than in the nozzle passages 79 and 83 and flow in the direction of the arrows 97 will occur.

This will cause two effects. First, the flow through the passageway 94 will cause the air to mix with the fuel flowing as indicated by the arrows 98 and will assist in atomizing this fuel. In addition, the air flow through the passage 95 will deflect the fuel from the injector nozzle 76 away from the nozzle ports 79 to the nozzle port 83 so that substantially all of the fuel will flow in the direction indicated by the solid arrow 98. Hence, the larger portion of the fuel will be delivered to the center intake passage 42 that serves the center intake valve seat.

In addition, the fuel will impinge upon the valve element 66 and this will help it to be further distributed with the air flow which also impinges on this surface and then sweeps toward the opening on the side of the valve seat 45 closest to the cylinder bore axis 26. Thus, the fuel supply will be directed primarily to the center intake valve seat 45 and in the area where the flow velocity is the highest so as to insure good mixing and good atomization. In addition, since this valve is positioned more in line with the spark plug 32 and specifically its spark gap 33, it will be insured that there is a richer fuel air mixture in this area than in the remainder of the combustion chamber so as to achieve a form of stratification.

When the engine speed and load increases, the air control valve 88 will be closed. In addition, there will be less pressure difference that would tend to cause the air assist action to operate. Under this condition, most of the fuel will be discharged to the nozzle discharge ports 79 because of the offsetting of the injector nozzle port 76. Of course, there still will be adequate fuel to the center intake valve seat 45 so as to insure a primarily homogeneous mixture under high speed high load conditions. The actual strategy by which the control valve 68 and the air control valve 88 are operated can be varied depending upon the desired results.

Hence it will be seen that this construction provides in effect a fuel injection nozzle that has a different spray pattern under varying conditions although the injector nozzle itself can be conventional. This function is provided entirely in the insert piece 78 and thus the total cost can be kept more reasonable.

Figure 8:
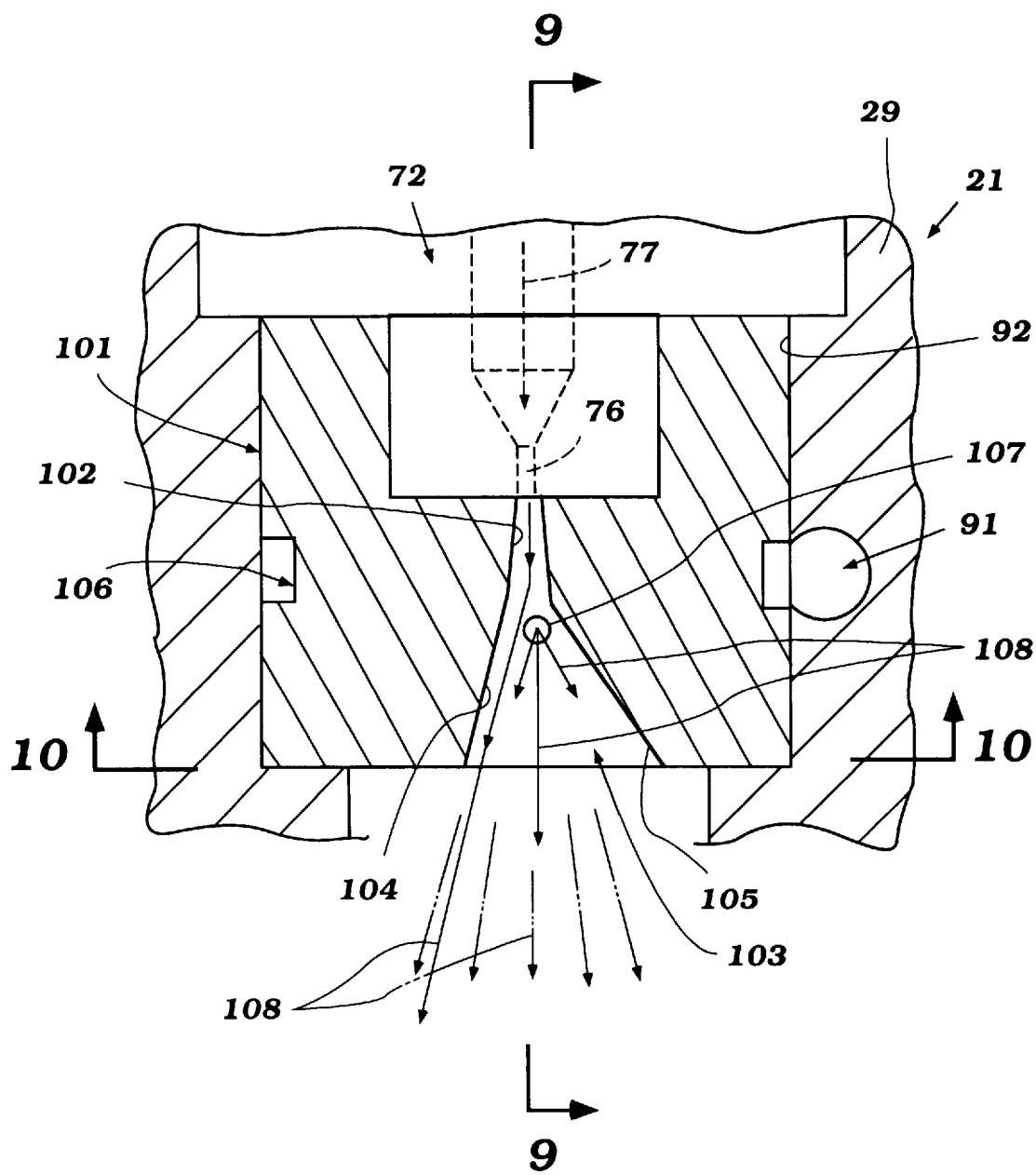
FIG. 8 is a cross-sectional view, in part similar to FIG. 4, and shows another embodiment of the invention.

FIG. 8 shows a torque curve and air assist curve with the torque curve being indicated at T and the air assist curve being indicated at A. As will be seen, the air assist is primarily generated under the low speed, low load conditions when the redirection of the fuel spray and the atomization of it is more important and necessary.

Figure 9:
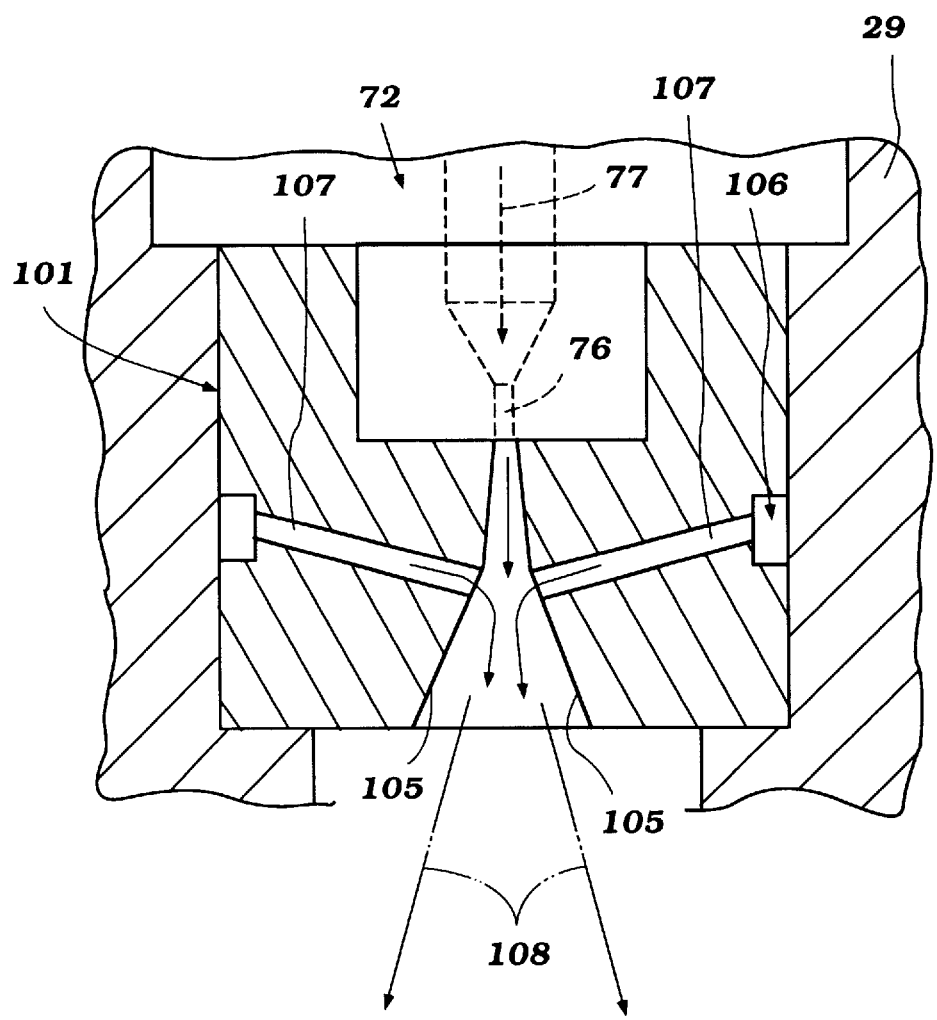
FIG. 9 is a cross-sectional view taken along the line 9—9 of FIG. 8.
Figure 10:
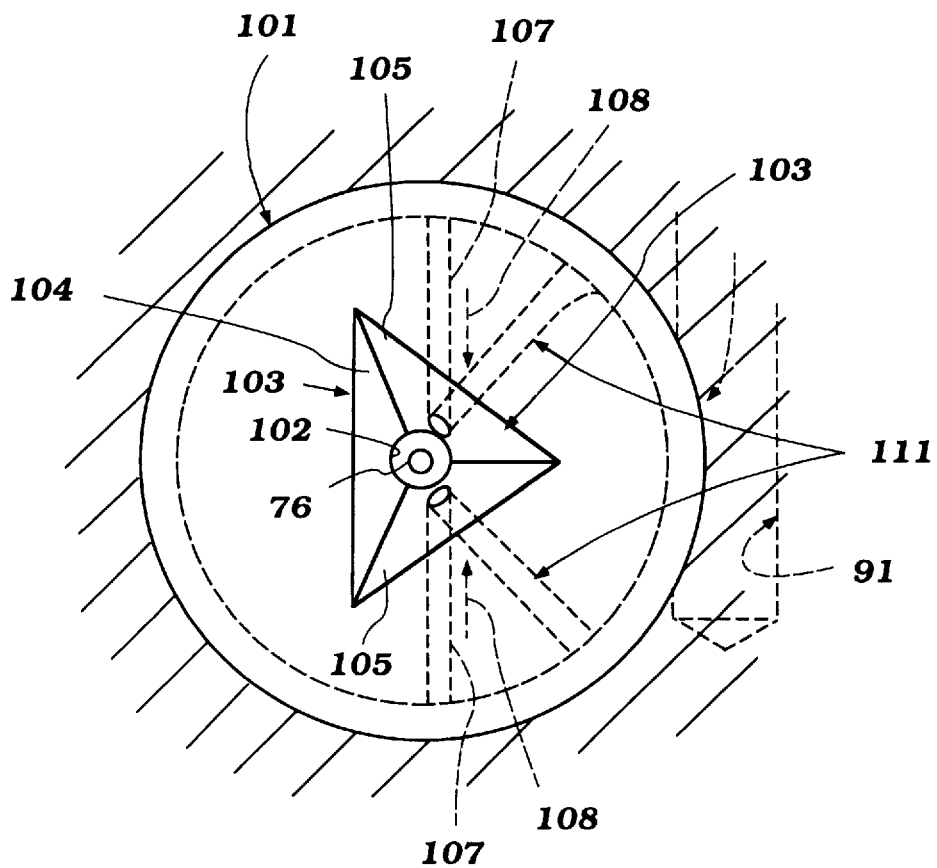
FIG. 10 is a cross-sectional view taken along the line 10—10 of FIG. 8.

FIGS. 8–10 show another embodiment which differs from the embodiment of the invention as thus far described only in the way in which the flow from the fuel injection nozzle 72 is controlled by the air assist system. Specifically, this embodiment differs from the previously described embodiment only in the construction and configuration of the insert piece, indicated generally by the reference numeral 101 in these figures. Therefore, and to understand the operation and construction of this embodiment, only three figures, FIGS. 8–10, corresponding to FIGS. 4, 5 and 6 of the previous embodiment, are believed to be necessary to permit those skilled in the art to understand the invention.

In this embodiment, the insert piece 101 is provided with an entry channel 102 that has a generally conical shape section beginning at a smaller opening end adjacent the fuel injector nozzle 76 and terminating at its outlet end in a generally pyramidal shape recess 103. However, the pyramid is formed by three, rather than four sides, comprised of a first side 104 and a pair of second and third sides 105. The apex of the pyramid is coincident or in line with the injector nozzle discharge axis 77 and the side 103 is disposed more steeply than the remaining sides 105. As with the previously described embodiment, the outer peripheral side of the insert piece 101 is formed with a circumferential groove 106 which is intersected by the air drilling 91 so that air will be introduced, when the control valve 88 is opened, to the outer periphery of the insert piece 101.

A pair of drilled passages 107 extend from the air manifold groove 106 to the portion of the side faces 105 immediately adjacent the discharge end of the inlet opening 102. In the embodiment shown in solid lines in these figures, these passageways extend toward each other and generally perpendicularly to the faces 105. Hence, when air is injected by opening of the valve 88, the air flow will be as shown in FIGS. 8 and 9 and the fuel sprayed from the nozzle 76 will be directed toward and along the side 104 to be directed in the same general direction as shown in FIG. 1. Thus, the fuel will be directed primarily toward the center intake valve seat 45 and impinge upon the control valve surface 66 as with the previously described embodiment. The direction of air flow in this embodiment is indicated by the arrows 108.

When no air assist is provided, then the flow will be generally in the direction indicated by the phantom line arrows and the mixture will be more homogeneously delivered to the cylinder head intake passage 34.

Figure 11:
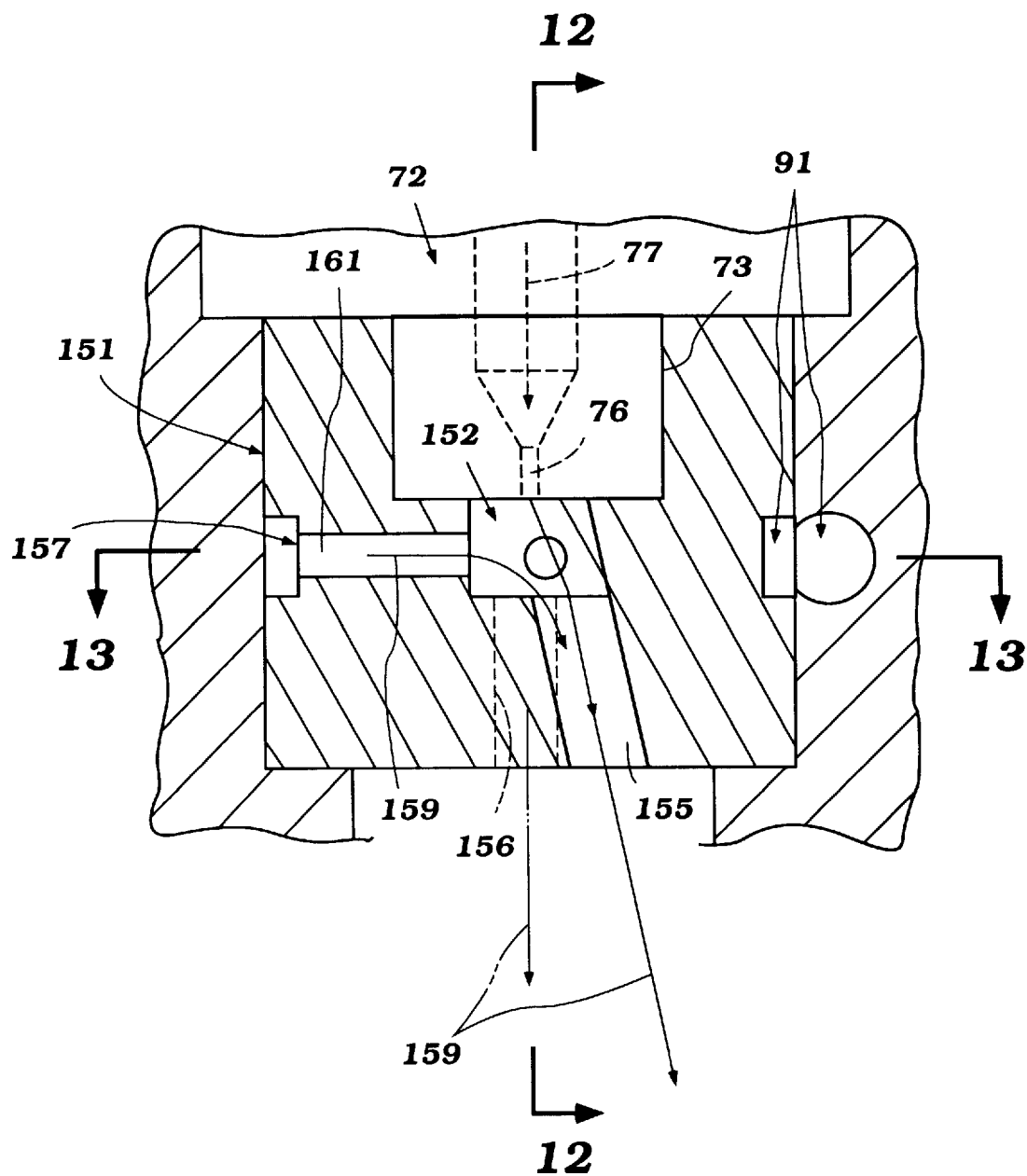
FIG. 11 is a cross-sectional view, in part similar to FIGS. 4 and 8, and shows another embodiment of the invention.

Although the solid line embodiments of FIGS. 8–10 show the drill passages 107 lying in a common plane and extending somewhat perpendicularly to the faces 105, the passages may be more inclined, as shown at 111 in phantom lines in FIG. 11 so as to further direct and concentrate the flow toward the recess surface 104. In addition, this action will further assist in the tumble flow in the combustion chamber at the time when the control valve element 66 is in the position shown in FIG. 1.

Figure 12:
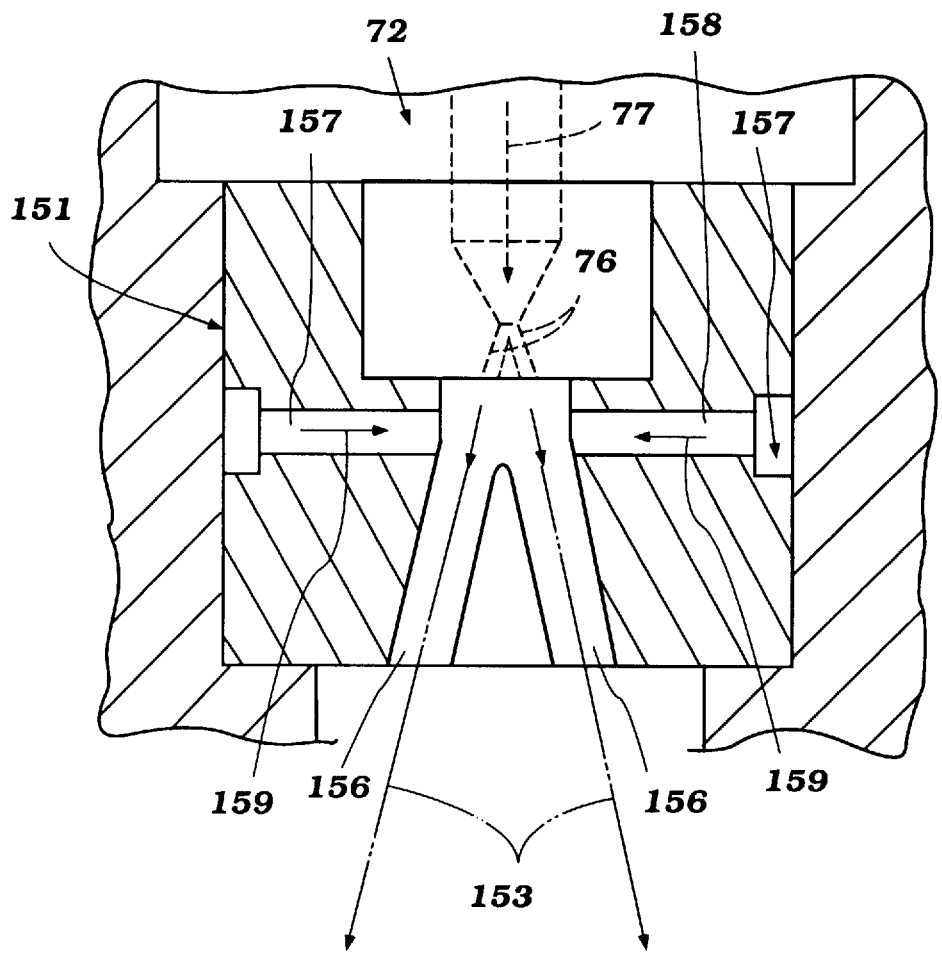
FIG. 12 is a cross-sectional view taken along the line 12—12 of FIG. 11.
Figure 13:
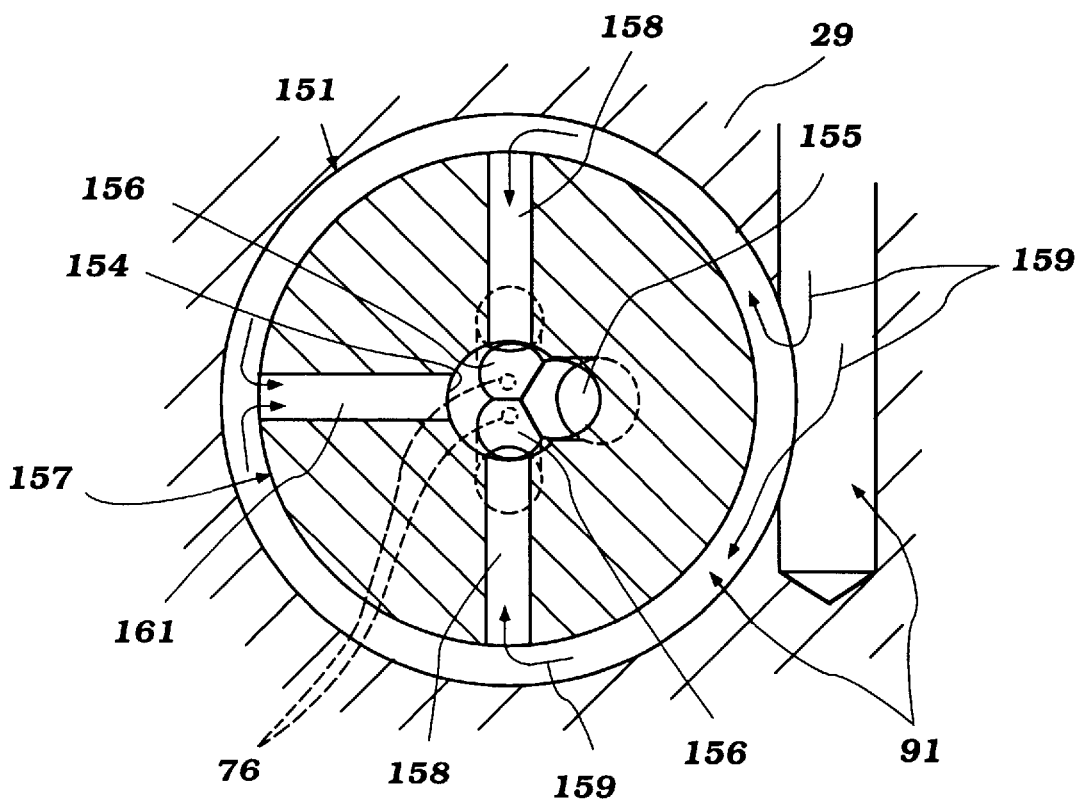
FIG. 13 is a cross-sectional view taken along the line 13—13 of FIG. 11.

FIGS. 11–13 show another embodiment of the invention, which like the embodiment of FIGS. 8–11 differs from the embodiment of FIGS. 1–7 only in the shape of the insert piece, indicated generally by the reference numeral 151 in these figures. For that reason, only three views corresponding to FIGS. 4, 5 and 6 and 8, 9 and 10 of the previously described embodiments are believed necessary to enable those skilled in the art to understand and practice this embodiment. For the same reason, components which are the same as those previously described have been identified by the same reference numerals and will be described again only insofar as is necessary to understand the construction and operation of this embodiment.

In this embodiment, the insert piece 151 is provided with an inlet channel 152 that registers with the fuel injector nozzle portion 73. In this embodiment, the fuel injector nozzle 73 has a pair of discharge nozzle ports 76 that are disposed at an angle to each other as best shown in FIG. 12. These nozzles discharge along a spray path indicated by the arrows 153.

The inlet channel 152 has a generally cylindrical portion 154 that is intersected by a further portion formed by a drilling 155 and which extends through the lower face of the insert piece in a single discharge opening. This single discharge opening 155 is relatively large in cross-sectional area and is directed primarily toward the side of the center intake passage 42 away from the valve element 66 in its closed position and toward the air gap that exists between this valve and the wall of the intake passage portion 42 when the valve element 66 is in the position shown in FIG. 1. Hence and as will be described, rather than spraying on the valve element surface 66 when the valve element is in its flow redirecting position, the spray will be directed more toward the open area.

In addition to the discharge port 155, there are provided a further pair of discharge passages 156 which have their axes lying in a common plane and which diverge downwardly toward the lower surface of the insert piece 151. These passages 156 are generally coextensive with the injector nozzle discharge passages 76 and hence the discharge lines 153 of the injector nozzle opening 76 are coextensive with the discharge passages 156.

As with the previously described embodiment, there is also provided in the outer periphery of the insert piece 151 a circumferential groove 157 which is intersected by the drilled passageway 91 so as to form an air manifold that extends around the periphery of the insert piece. This air manifold is intersected by a pair of drilled passages 158 which have their centers lying in the same plane as the discharge passages 156 of the insert piece 151. Thus, when air is delivered upon opening of the control valve 88, there will be an air flow in the direction of the arrows 159 as shown in FIG. 12 which tends to direct the flow of fuel into the inlet cavity 152 and away from the discharge nozzle portions 156.

In addition, there is a further drilled passageway 161 (FIGS. 11 and 13) which is directed toward the inlet channel to the discharge port 159 so as to redirect this fuel flow toward the discharge portion 155 so the fuel will be directed, as aforenoted, to the gap between the closed control valve portion 66 and the center intake passage 42 when the control valve is in its closed position. When open, the flow will follow in a more uniform and homogeneous path as shown by the phantom line arrows in these figures.

Figure 14:
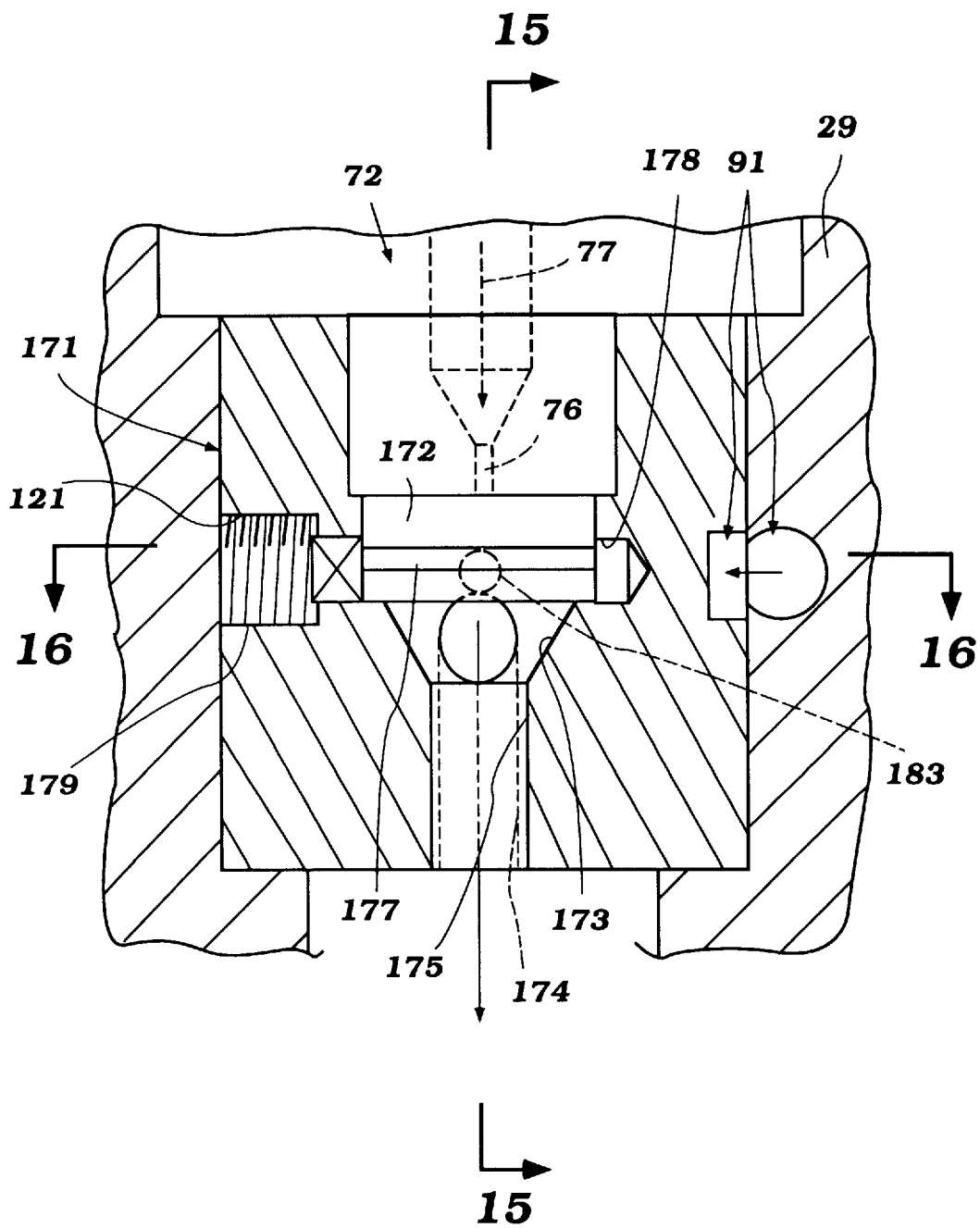
FIG. 14 is a cross-sectional view, in part similar to FIGS. 4, 8, and 11, and shows another embodiment of the invention.
Figure 15:
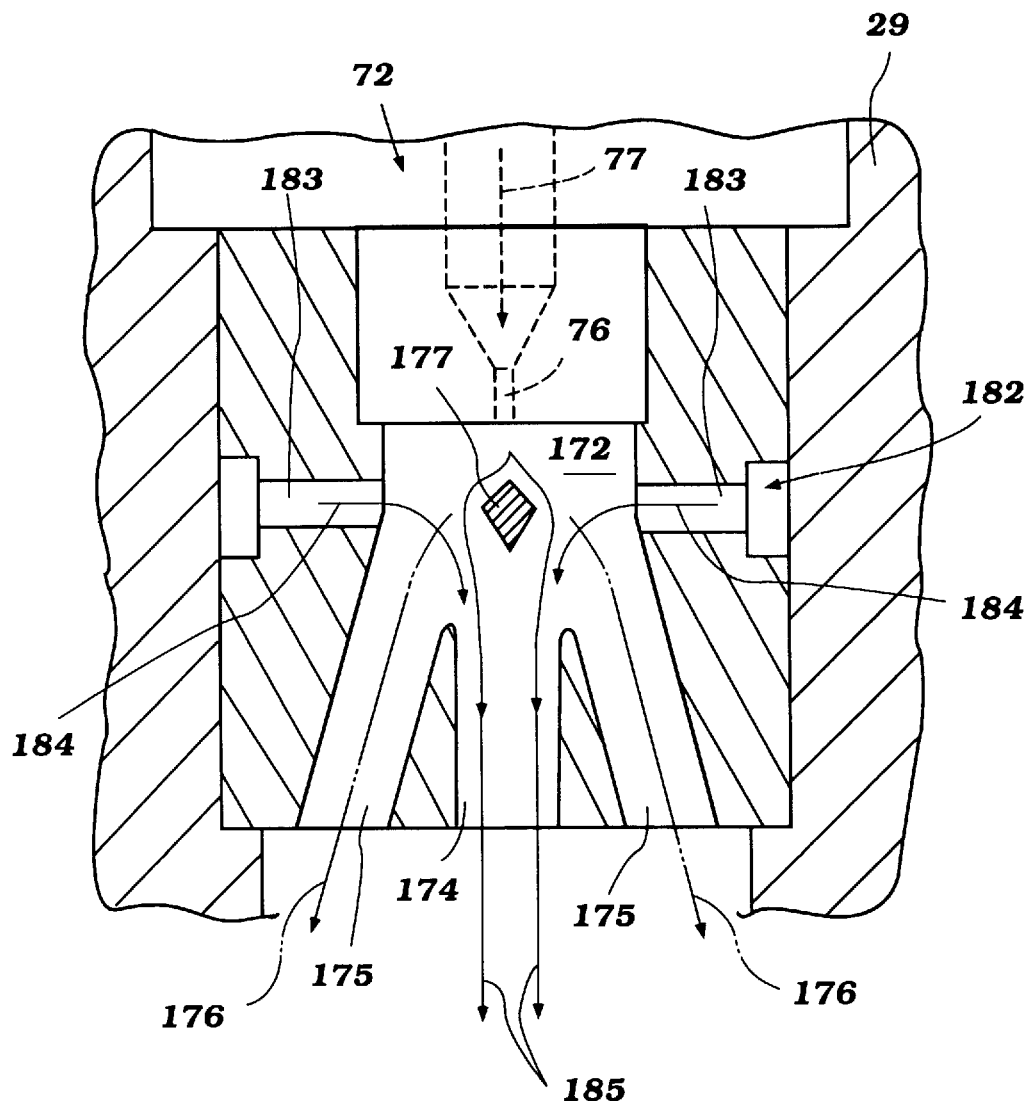
FIG. 15 is a cross-sectional view taken along the line 15—15 of FIG. 14.
Figure 16:
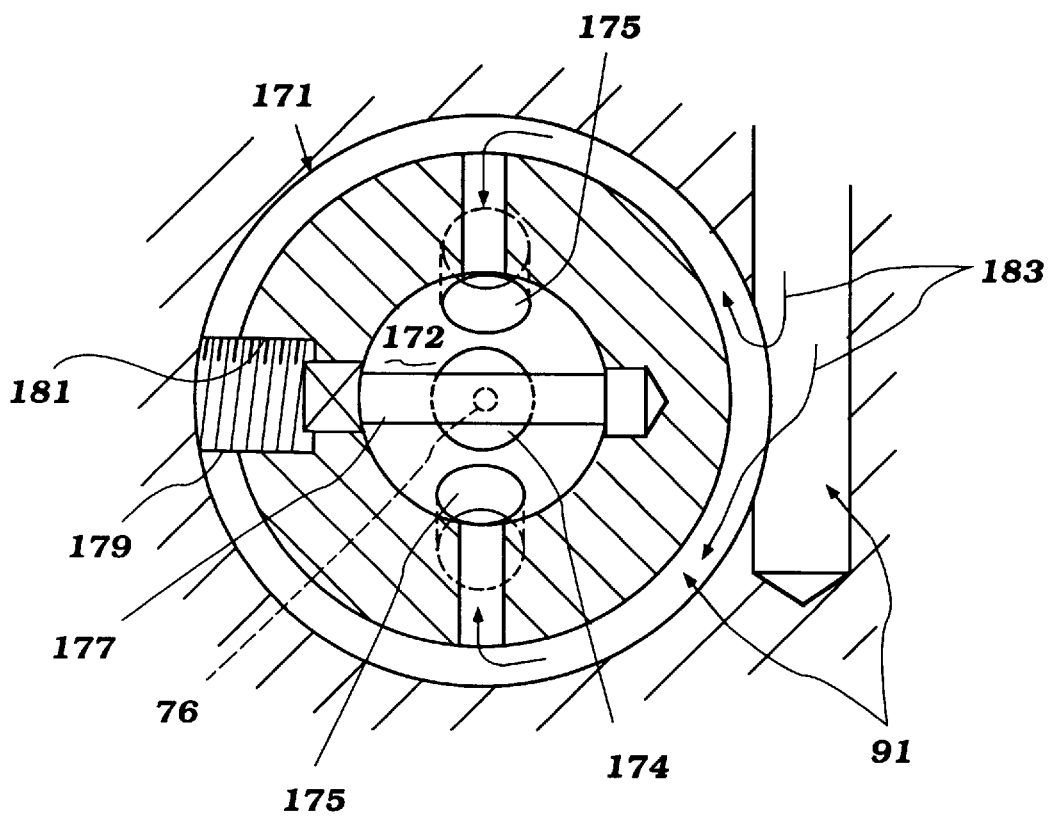
FIG. 16 is a cross-sectional view taken along the line 16—16 of FIG. 14.

An insert piece constructed in accordance with a still further embodiment of the invention is shown in FIGS. 14–16 and is identified generally by the reference numeral 171. This embodiment is similar to the embodiments of FIGS. 4–6, 8–10, and 11–13 and can be employed with an engine as shown in FIGS. 1–3. Therefore, where components are the same, they have been identified by the same reference numerals and only three figures corresponding to FIGS. 4–6, 8–10, and 11–13 are necessary to enable those skilled in the art to understand the construction and operation of this embodiment.

This embodiment is also designed so as to be primarily useful with a fuel injector having only one discharge nozzle 76, although it will be apparent to those skilled in the art that an arrangement of the type shown in FIGS. 11–13 can also be employed in conjunction with this embodiment. However, the insert piece 171 itself has a construction which functions so as to split the flow from the injector nozzle port 76 even when the flow is directed primarily only to the center intake passage portion 42, as will also become apparent.

The insert piece 171 has a generally large cylindrical opening 172 that registers with the injector nozzle discharge port 76 but which is substantially greater in area than it. This opening 172 transitions to a funnel shape portion 173 which is, in turn, intersected by a centrally positioned discharge port 174 that has its axis generally aligned with the injector nozzle 77. In addition, a pair of side passages 175 are provided which have their axes 176 lying in a common plane with the axis 77 and that of the central portion 174. Hence, unlike the previously described embodiments, this embodiment provides generally co-planer discharge passages 174 and 175 in the insert piece 171.

The central passage 174 is of slightly smaller diameter than each of the side passages 175, but the combined flow area of the side passages 175 is greater than that of the single center passage 174.

In accordance with this embodiment, a splitter bar 177 is mounted in a cross-drilled opening 178 formed in the insert piece 171. The splitter bar 177, as shown in FIG. 15, has a generally diamond shape and is disposed so as to be intersected by the spray axis 77 of the injector nozzle port 76. The splitter block 177 is held axially in position by means of a set screw 179 threaded into a tapped opening 181 at the outer end of the drill passageway 178.

Like the previously described embodiments, an air manifold 182 in the form of a circumferential groove extends around the outer periphery of the insert piece 171. This groove is intersected by the set screw 179 and is slightly less in axial height than this set screw.

A pair of diametrically opposed air passages 183 extend from the air manifold 182 into the insert piece inlet opening 172 in general alignment with the splitter bar 177. When the air control valve 88 is open, air will flow in the direction of the arrows 184 directly toward the splitter bar 177 and across the upper ends of the side discharge ports 175. This combined action will cause the fuel from the nozzle 76 first to spread around the splitter bar 177 and then to be directed back toward the discharge port 174 so as to provide a wider degree of fuel spacing and also so as to cause the fuel to flow, as shown by the arrows 185 in a generally parallel fashion rather than a fan-type spray as with conventional nozzle discharges. As previously noted, there will also be air mixing with the fuel spray so as to aid in the atomization. Again, this flow is possible because of the fact that the atmospheric air is at a higher pressure than the pressure in the discharge port 75 of the cylinder head 29.

Thus, with this embodiment, like those previously described embodiments, the fuel will be sprayed into the center intake passage 42 primarily under low speed, low load conditions. In this embodiment, a portion of the fuel will impinge on the control valve portion 66 and a portion will pass through the gap between it and the intake passage 42 so as to provide the combined affect of the embodiments of FIGS. 11–13 and the earlier described embodiments.

When the air control valve 88 is closed and the flow control valve 63 is opened, then the flow will be in the direction of the arrows 176 and more homogeneously into the combustion chamber.

From the foregoing description it should be readily apparent that the described embodiments are extremely effective in providing the desired degree of turbulence in the intake charge under low speed and low load conditions and also the desired degree of tumble. The air assist in combination with the fuel injector and the various embodiments of insert pieces will permit the fuel flow to be controlled when the control valve 63 is closed and to effect substantial redirections in the spray pattern. In addition, different spray paths are possible as if the injection nozzle had different spray patterns without modifying the basic fuel injector. Of course, the foregoing description is that of preferred embodiments of the invention and various changes and modifications may be made without departing from the spirit and scope of the invention, as defined by the appended claims.

We claim:

1. An internal combustion engine having an intake port communicating with a combustion chamber for delivering a charge thereto, an intake passage serving said intake port for supplying a charge thereto, a throttle valve for controlling the flow through said intake passage in response to operator demand, a fuel injector for injecting fuel into said intake passage, a control valve positioned in said intake passage downstream of said throttle valve and operated in response to at least one engine running condition for movement between a first position wherein the flow through said intake passage and said intake port is substantially unrestricted and in a first direction and a second position wherein the flow through said intake passage is substantially restricted and the flow toward said intake port is redirected, and means for altering the spray pattern from said fuel injector in response to the position of said control valve.

2. An internal combustion engine as set forth in claim 1, wherein the means for altering the spray pattern from the fuel injector comprises an insert piece interposed between a discharge nozzle of said fuel injector and the intake passage.

3. An internal combustion engine as set forth in claim 2, wherein the means for altering the spray pattern comprises means for delivering an air stream to the insert piece.

4. An internal combustion engine as set forth in claim 3, wherein the insert piece is provided with two separately directed outlet ports, each communicating with the discharge of the fuel injector.

5. An internal combustion engine as set forth in claim 4, wherein the air stream directs the fuel from the fuel injector to a respective one of the insert piece outlet ports.

6. An internal combustion engine as set forth in claim 4, wherein the insert piece is formed with three outlet ports.

7. An internal combustion engine as set forth in claim 6, wherein the air stream is adapted to direct the flow either to one of the outlet ports or all of the outlet ports.

8. An internal combustion engine as set forth in claim 3, wherein the air stream is provided by supplying air at substantially atmospheric pressure to the insert piece.

9. An internal combustion engine as set forth in claim 1, wherein the means for altering the spray pattern of the fuel injector directs the spray toward the body of the control valve when the control valve is in its second position.

10. An internal combustion engine as set forth in claim 1, wherein the means for altering the spray pattern directs the fuel spray toward a gap between the control valve and the intake passage when the control valve is in its second position.

11. An internal combustion engine as set forth in claim 1, wherein the intake passage serves a pair of intake ports.

12. An internal combustion engine as set forth in claim 11, wherein the control valve in its second position substantially precludes flow through one of the intake ports and redirects the flow through the remaining intake port.

13. An internal combustion engine as set forth in claim 12, wherein there are provided three intake ports and in the second position of the control valve the flow to two of the intake ports is substantially redirected.

14. An internal combustion engine as set forth in claim 13, wherein the intake ports comprise a first center intake port disposed further from a plane containing the axis of an associated cylinder bore than the remaining side intake ports.

15. An internal combustion engine as set forth in claim 14, wherein the control valve generates a tumble action to the intake charge when in its second position.

16. An internal combustion engine as set forth in claim 15, wherein the means for altering the spray pattern comprises means for delivering an air stream to the insert piece.

17. An internal combustion engine as set forth in claim 16, wherein the insert piece is provided with two separately directed outlet ports, each communicating with the discharge of the fuel injector.

18. An internal combustion engine as set forth in claim 17, wherein the air stream directs the fuel from the fuel injector to a respective one of the insert piece outlet ports.

19. An internal combustion engine as set forth in claim 17, wherein the insert piece is formed with three outlet ports.

20. An internal combustion engine as set forth in claim 19, wherein the air stream is adapted to direct the flow either to one of the outlet ports or all of the outlet ports.

21. An internal combustion engine as set forth in claim 16, wherein the air stream is provided by supplying air at substantially atmospheric pressure to the insert piece.

22. An internal combustion engine as set forth in claim 16, wherein the means for altering the spray pattern of the fuel injector directs the spray toward the body of the control valve when the control valve is in its second position.

23. An internal combustion engine as set forth in claim 16, wherein the means for altering the spray pattern directs the fuel spray toward a gap between the control valve and the intake passage when the control valve is in its second position.

24. An internal combustion engine as set forth in claim 17, wherein the two separately directed discharge ports each have different spray patterns.

25. An internal combustion engine having an intake port communicating with a combustion chamber for delivering a charge thereto, an intake passage serving said intake port for supplying a charge thereto, a fuel injector for injecting fuel into said intake passage, a control valve positioned in said intake passage and moveable between a first position wherein the flow through said intake passage and said intake port is substantially unrestricted and in a first direction and a second position wherein the flow through said intake passage is substantially restricted and the flow toward said intake port is redirected, and means for altering the spray path from said fuel injector in response to the position of said control valve comprising an insert piece interposed between a discharge nozzle of said fuel injector and said intake passage, said insert piece being provided with three separately directed outlet ports, each communicating with the discharge of said fuel injector, and means for delivering an air stream to said insert piece, said air stream being adapted to direct the flow either to one of said outlet ports or all of said outlet ports.

* * * * *